US006385539B1

(12) United States Patent
Wilson et al.

(10) Patent No.: US 6,385,539 B1
(45) Date of Patent: May 7, 2002

(54) METHOD AND SYSTEM FOR AUTONOMOUSLY DEVELOPING OR AUGMENTING GEOGRAPHICAL DATABASES BY MINING UNCOORDINATED PROBE DATA

(75) Inventors: Christopher Kenneth Hoover Wilson, Redwood City; Seth Olds Rogers; Patrick Wyatt Langley, both of Palo Alto, all of CA (US)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/373,559

(22) Filed: Aug. 13, 1999

(51) Int. Cl.[7] .......................... G06F 165/00; G08B 1/09

(52) U.S. Cl. ....................... 701/213; 701/117; 340/995; 340/905

(58) Field of Search ................................ 701/117, 118, 701/119, 208, 213, 200, 207, 212, 214, 215; 342/454, 456, 357.13, 357.17; 702/5; 340/995, 905, 989, 910, 913, 2.7, 286.14, 933, 934, 936, 988

(56) References Cited

U.S. PATENT DOCUMENTS 5,539,645 A 7/1996 Mandhyan et al. ......... 701/119
5,703,778 A * 12/1997 Takahashi et al. .......... 364/437
5,801,943 A * 9/1998 Nasburg ..................... 364/436
5,889,447 A * 3/1999 Fastenrath .................. 340/905
5,979,581 A * 11/1999 Ravani et al. ............. 180/168
5,999,878 A * 12/1999 Hanson et al. .............. 701/208
6,011,515 A * 1/2000 Radcliffe et al. ........... 342/453
6,047,234 A * 4/2000 Cherveny et al. ........... 701/200
6,150,961 A * 11/2000 Alewine et al. ............ 340/995

FOREIGN PATENT DOCUMENTS

DE 195 25 291 12/1996
DE 196 04 364 A1 8/1997
DE 196 50 844 6/1998

* cited by examiner

*Primary Examiner*—Tan Nguyen
*Assistant Examiner*—Dalena Tran
(74) *Attorney, Agent, or Firm*—Crowell & Moring LLP

(57) ABSTRACT

A method and system are provided for developing geospatial information concerning a particular area using a plurality of uncoordinated probe vehicles moving in the area. The probe vehicles are equipped with a position determining system and gather probe vehicle specific geospatial information as the vehicles move in the area. This probe vehicle specific information is combined over time into a data set. A central processor analyzes the data set to determine geospatial information having a higher quality than that gathered by the individual probe vehicles for the particular area.

17 Claims, 8 Drawing Sheets

DIGITAL MAP CENTERLINE
64
68
LANE 3
LANE 2
LANE 1
m
p
n
66
TRACE

⊗ – NEW MAP CENTERLINE
n – NEAREST TRACE POINT (BY INTERPOLATION OF GPS TRACE POINTS)
x – GPS TRACE POINTS

METHOD AND SYSTEM FOR AUTONOMOUSLY DEVELOPING OR AUGMENTING GEOGRAPHICAL DATABASES BY MINING UNCOORDINATED PROBE DATA

BACKGROUND AND SUMMARY OF THE INVENTION

The present invention relates to a method and system for autonomously developing geospatially specific knowledge and, more particularly, to developing or augmenting a geographic information system database by utilizing indiscriminately gathered actual probe data.

With the advance of information technologies, in particular computer processing, communications and global positioning, systems and processes have been developed to utilize these technologies to provide useful information. For example, satellite based positioning systems, such as the U.S. Global Positioning System (GPS) and the Russian Global Navigation Satellite System (GLONASS) provide position information used in vehicle and personal navigation, such as for aircraft, marine-based vehicles, land-based vehicles, as well as an individual's own use. The GPS and GLONASS systems provide an absolute position anywhere on the earth where at least four satellites can be clearly observed. Using known differential techniques, a positional accuracy of one meter or less can often be obtained.

It is also known to use fleets of probe vehicles, such as cars and trucks, equipped with differential GPS (DGPS) receivers to provide raw data along particular routes in order to monitor traffic flow. Such a system is described in U.S. Pat. No. 5,539,645, wherein a central computer receives collected and reported baseline data from probe vehicles concerning time varying quantities along selected routes. This "raw" calibration data is modeled to determine normal traffic speeds and patterns, which are compared with monitored data. Deviations outside acceptable variations are reported to the central processor, which can then determine variously occurring traffic events. This reference describes a desirable position information accuracy of, for example, 0.5 meters, in order to distinguish lane changes and particular lanes of a multi-lane roadway being travelled. While such a known DGPS receiver may have the requisite accuracy to locate a vehicle within a particular lane, it has not previously been possible to reliably determine the lane locations themselves.

German Patent documents DE 195 25 291 and DE 196 50 844 describe methods for analyzing information received from probe vehicles traveling a current route in order to associate the information as attributes of corresponding road sections in a digital street map. The attributes provide navigation information for the vehicle to travel a particular route. The German '844 reference stores static and dynamic parameters for the detected route in the digital map. These static parameters include structural characteristics of the path driven. The dynamic parameters are continually adapted to the real conditions of the detected route street sections in order to determine a vehicle drive route. Both of these systems attempt to provide reliable traffic guidance and navigation information.

All of the above-described known systems utilize DGPS position information in conjunction with conventionally obtained digital road maps in order to assist in navigation by determining preferred routes and/or by providing traffic monitoring information. In the future, advanced safety and navigation applications in vehicles will require highly accurate and detailed digital maps useful in conjunction with the global positioning systems. The construction of such detailed digital maps has not previously been readily possible due to the expensive and time-consuming nature of manual lane measurements over countless road miles in the road networks.

Attempts have been made at automated mapping systems. For example, the reference "Positioning Accuracy of the GPSvan", Proceedings of the 52$^{nd}$ Annual National Technical Meeting of the Institute of Navigation, pp. 657–665, Palm Springs, Calif., 1995, describes a special-purpose, labor-intensive effort to exhaustively map a target area. Here, a specially equipped vehicle in the form of a GPSvan combines numerous sensors, including multiple GPS receivers, laser cameras and stereo vision systems, to capture detailed information about the roadway traveled upon. Such vehicles are, however, prohibitively expensive and require dedicated personnel to encode features as the vehicle drives.

There is therefore needed an automatic method and system to develop, refine and augment digital maps to provide the requisite geospatial accuracy for future fields relating to safety, navigation, marketing, etc.

The present invention meets these needs by developing geospatial information concerning a particular area using a plurality of uncoordinated probe systems moving in the area. The method includes the steps of obtaining probe system specific geospatial information of a lower quality from the plurality of probe systems moving in the area. Next, the probe system specific information is combined over time into a data set. The data set is then analyzed to determine higher quality geospatial information for the particular area. This "data-mining" system and method can be used to develop and/or refine digital maps based on position traces (the geospatial information) generated from the probe systems equipped with global positioning system receivers having differential corrections.

Although the method and system according to the present invention will be described in detail with reference to probe vehicles providing positional trace information to refine and augment commercially available digital road maps, it will be understood that the invention is more generally applicable to using uncoordinated probe systems, having only poor or moderate quality GPS receivers, to develop geographical databases, such as maps, that are of a medium to high quality. Moreover, the probe systems can refine and augment any known database having a geographic component using a suitable number of position traces obtained from the probe systems, be they vehicular or otherwise.

According to the invention, a large number of probe vehicles are equipped with a position/time sensor to record their position and time whenever the probe vehicle is in motion. Other sensors and data types may also be combined with this data. In fact, the time data is not even necessary. The probe vehicles are driven in their normal fashion such that, over a period of time, all possible road routes will be traversed by at least one of the probe vehicles. The data from the probe vehicles is combined into a data set, either in real-time or via post-processing. This data set is then subject to statistical and/or other forms of analysis to identify various features. Based upon the data from many probe vehicles, its combination provides highly accurate measurements of the physical environment. A map is then generated from the accurate measurements. This thus provides a probabilistic approach to generating a map which is advantageous for autonomous vehicle applications in that it describes how people actually behave on a road network. Further advantageously, statistical evaluation of the data set provides information apart from the road geometry, such as traffic control information. When the position data is combined with data from other vehicle sensors, such as traction control, suspension, turn indicators, vision systems, automotive radar, etc., it becomes possible to locate other environmental conditions such as potholes, dirt roads, ice on the roads, guard rails, etc.

In a particular embodiment, the present invention advantageously builds and/or enhances digital road maps, which serve as a baseline map, with geospatially specific information by mining massive amounts of differential global positioning system (DGPS) trace data from uncoordinated probe vehicles.

When building the digital road map, the initial trace data from the uncoordinated probe vehicles serves as a base line map, which is refined based on the additional trace data. When augmenting or enhancing a commercially available digital road map, the data from the commercially available digital road map serves as the base line map, with the additional trace data from the uncoordinated probe vehicles refining the base line map data.

In an advantageous embodiment described herein, the DGPS traces from the uncoordinated probe vehicles are mined to enhance digital road maps with descriptions of lane structure including the number of lanes and their locations. The use of uncoordinated probe vehicles allows for unobtrusive and indiscriminate gathering of data from the multitude of drivers going about their ordinary business. The system does not require any special vehicles or expensive hardware to collect the data, relying on probe vehicles equipped with known DGPS systems. The resultant traces from the probe vehicles are mined for knowledge about the road network, in particular, vehicle lane information.

The system and method according to the invention determines a "virtual" centerline of a road, and then determines the actual road lanes using the virtual centerline. While the invention is described with respect to a "virtual" road centerline, it should be understood that this virtual centerline is an arbitrary convenience and that any line parallel to the road can be considered the virtual centerline. Beginning with the commercially available digital map serving as a baseline, the centerline from the digital map is brought into alignment with the DGPS traces from the probe vehicles traveling over a particular road segment. In general, this is done by computing the "average" between the current centerline and a new trace, weighted by a confidence factor in the centerline and the trace. As the system incrementally incorporates more traces into the average, errors in the traces are averaged out such that the new centerline is more accurate than any of the traces used to develop it.

While the original centerline in the digital map is not accurate enough to be used to compute constant lane "offsets" in order to identify vehicle lanes, the present invention recognizes that, by definition, any line parallel to the true vehicle lanes must be a constant perpendicular distance (hence "offset") from the vehicle lanes. Thus, the determination of a "virtual" centerline—based on the original centerline in the digital map and the multiple traces from the probe vehicles—better serves to determine the offset amounts in order to identify the actual vehicle lanes. These offsets are defined by the perpendicular distance of the vehicle lane to the virtual centerline, since all of the vehicle lanes are parallel to one another.

By assuming vehicle drivers are generally within a vehicle lane, the perpendicular distance from most positions of the vehicle to the virtual centerline provides an estimate of the offset for the particular lane being travelled. The method and system thus calculate an offset amount for each position in the position trace. These offsets are then grouped into lanes and averaged to find the vehicle lane centerline. A hierarchical agglomerative clustering-type algorithm is advantageously used to model the actual vehicle lanes and refine the digital road map based on the accurately represented virtual centerline of the road segment. According to the present invention, lane modeling is accomplished for a target road segment S, covered by a set of position traces P from probe vehicles, by first finding the accurate virtual centerline for the target road segment S using the set of position traces P, and then clustering P's offsets from the virtual centerline into the lane information.

The present invention can therefore build or augment digital maps with lane information, creating a resource usable by any lane-related automotive application. The computed lane models enable both safety applications, such as lane keeping, and convenience applications, such as lane-changing advice. The large number of positional traces obtained from the probe vehicles provides an inexpensive and automated method to compute the lane models, as well as other geographic information, such as traffic signals, stop signs, elevational changes, etc. For example, a combined digital road map built or enhanced with accurate lane modeled information in conjunction with an in-car positioning system advantageously enables: a lane departure warning/lane keeping safety application, a lane-level navigation application, and dynamic lane closure applications.

The lane departure warning/lane keeping safety application tracks a vehicle's current offset from the road/lane centerline. If the offset deviates more than a defined threshold amount, a warning signal is activated. Alternatively, the vehicle itself could assume control to avoid potential accidents. The defined threshold amount can advantageously be related to a standard deviation of the offsets during typical driving conditions. High positional accuracy is required with this safety application.

The lane-level navigation application enhances conventionally known standard road level navigation. The lane-level navigation advises the driver as to the specific lane one should choose to reach a particular destination without excessive and last-minute lane changing. In addition to the lane modeling information, lane-level navigation requires a model concerning the vehicle behavior at route intersections on a per-lane basis. For example, the position traces from the probe vehicles may indicate that 100% of drivers in the left lane at a particular intersection turn left, while 50% of drivers in the right lane go straight and 50% turn right.

The dynamic lane closure application makes comparisons between current road segment lane occupancy and past road segment lane occupancy if the aggregate data on lane occupancy is available dynamically via wireless communications. If a particular lane is under-occupied, the dynamic lane closure application infers that the lane is closed, for example, due to an accident or construction. Vehicle navigation systems can then factor this into account when calculating vehicle routes.

Of course, the lane modeling information according to the present invention can be used with other safety and convenience applications not described herein to provide additional driver benefits. Examples of applications enabled by the combination of a digital road map with accurate lane models and in-car positioning systems are described in the paper entitled "The Potential of Precision Maps in Intelligent Vehicles", Proceedings of the IEEE International Conference on Intelligent Vehicles, pages 419–422, Stuttgart, Germany, Oct. 1998, the contents of which are expressly incorporated by reference herein.

Prior known approaches to determine lane boundaries attempt to do so directly, such as by using vehicle-mounted machine vision systems to find lane markings in relation to the vehicle position. The present invention, however, effectively allows the driver's lane keeping ability to identify the center of the lane. The prior approaches encountered numerous limitations. First, the machine vision system had to be correctly calibrated to the lane markings sensed. For a vision based system, machine recognizable lane features of some type are required. Second, it is difficult if not impossible to build an accurate database of lane models from machine vision systems alone, or any other relative sensing method for that matter. This is because the straight-forward approach to building such a database stores the lane structures in a spatially absolute reference system. Vehicles without an absolute sensing method, such as GPS equipped vehicles, have no way to register the data spatially, and consequently, no way to look ahead around corners and over hills for example.

As noted above, the present invention relies on DGPS traces from probe vehicles to effectively let the driver's lane keeping ability identify the center of the lane. The absolute nature of this data provides information on upcoming terrain which is not directly sensible from the vehicle. This builds an accurate database of lane models.

In an advantageous embodiment with respect to lane keeping applications of the present invention, machine vision techniques are additionally incorporated in the event the GPS accuracy suffers, such as when one or more satellite views are partially or totally obstructed. The use of local sensors, such as the machine vision systems, can compensate for the satellite visibility problems. This enhances the positional accuracy available for the vehicle in order to perform the lane keeping functions.

Other objects, advantages and novel features of the present invention will become apparent from the following detailed description of the invention when considered in conjunction with the accompanying drawings.

DETAILED DESCRIPTION OF THE DRAWINGS

The method and system for autonomously developing and/or augmenting geographical databases by mining uncoordinated probe data will be explained herein with reference to a particular embodiment in which digital road maps are refined and augmented to define vehicle lane information, such as the number of lanes and their locations.

Beginning with a digital baseline map that is commercially available, lane models are used to predict a vehicle's lane with high accuracy from only a small number of passes over a particular road segment by probe vehicles. The probe vehicles are equipped with position determining systems providing position traces as the probe vehicles indiscriminately gather position data in an uncoordinated fashion based on the driver's actions in operating the vehicle. This tracking of the probe vehicles as they sample the road network allows for the determination of the lane structure without error-correcting feedback.

Figure 1:
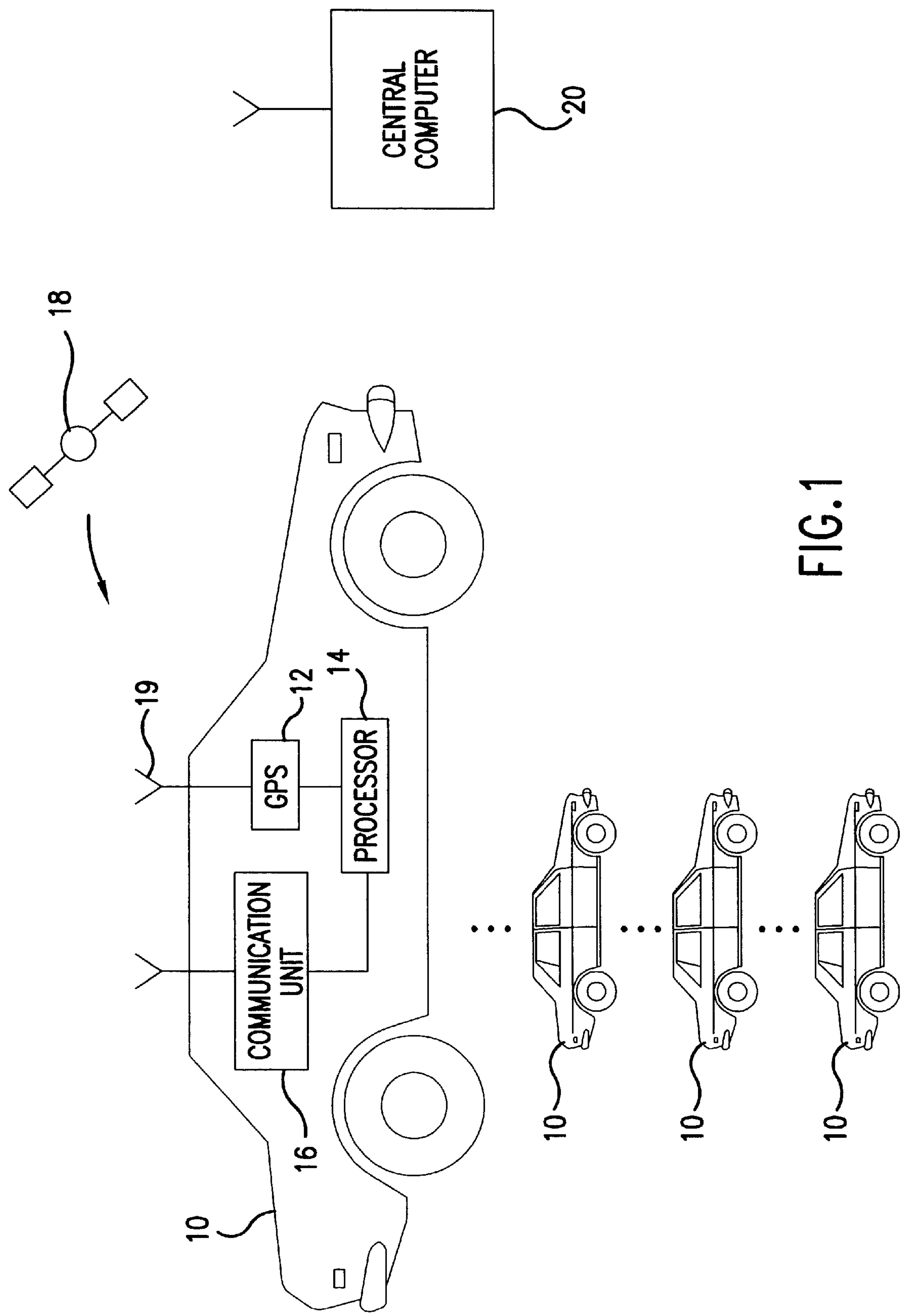
FIG. 1 generally represents the system according to the present invention.

Referring to FIG. 1, in order to sample the road network, a fleet of probe vehicles 10 (only one of which is shown in detail), such as cars, are equipped with absolute position sensors in order to record positional traces of their trips. Each record in the position trace includes the latitude and longitude of the probe vehicle 10, and possibly estimated standard deviations on the latitude and longitude. The probe vehicles 10 record these positions at regular intervals.

Each probe vehicle 10 includes two main components: an accurate position sensor, preferably based upon a GPS receiver 12 (and especially a DGPS receiver) coupled with a processor 14, and a communications unit 16 to communicate with a centralized computer 20. As is known, the GPS receiver 12 receives GPS signals from the earth orbiting GPS satellites 18 via an antenna 19. By using DGPS receivers, positional accuracy can be obtained to better than one meter.

Because the cost of GPS systems is rapidly decreasing to the point where most new vehicles will likely have at least one GPS receiver within the next few years, along with the rapidly advancing wireless technology to provide communications, a tremendous number of probe vehicles 10 will automatically be available such that a database of raw positional traces can be built at minimal cost.

Figure 2:
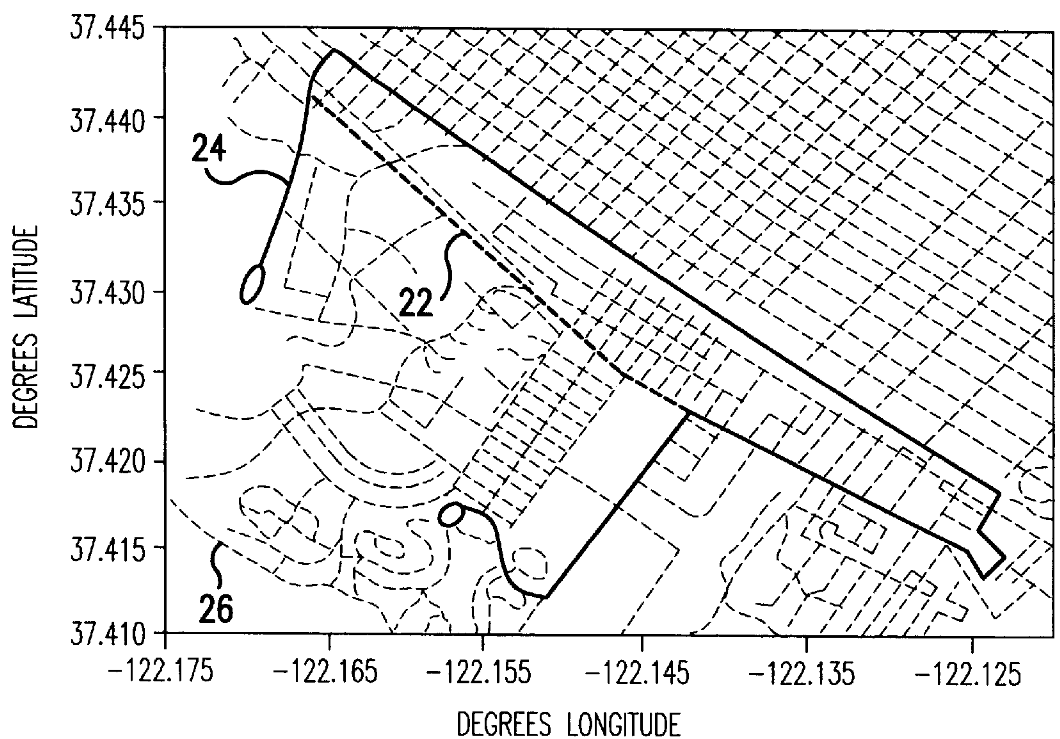
FIG. 2 is a plot of two sample position traces of raw GPS position information with a digital map superimposed thereon.

The probe vehicles 10 generate position traces as they travel over the road network. FIG. 2 plots two sample position traces over an actually existing road network in the San Francisco bay area. These position traces 22, 24 are overlayed on a rough digital map 26 that is commercially available, such as those from Navigation Technologies, Inc. of Rosemont, Ill. Such digital maps divide the road network into portions of road between two intersections, called segments. For example, at a standard highway interchange, the segments include the part of the highway before the exit, the part between the exit and the entrance, and the part after the entrance.

Each segment has a unique identifier and associated attributes, including the segments to which each end connects, along with a rough approximation of the segment shape. It is this rough digital map that serves as the baseline map for the process of the present invention. As can be seen in FIG. 2, the two sample position traces 22, 24 overlap along portions of their routes and are distinct in other portions.

Figure 3:
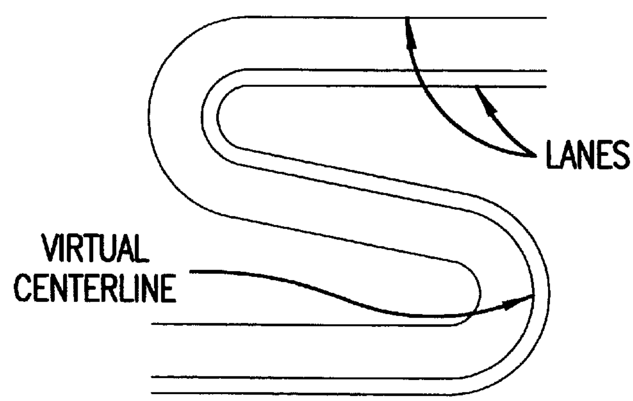
FIG. 3 is an illustration of a representative road segment having parallel lanes and a virtual centerline.

In order to determine the information of interest, i.e., the vehicle lanes of the road network, a "virtual" centerline of a particular road segment is determined, and then "offsets" of the position traces to this centerline are clustered to determine the vehicle lanes. The use of a virtual centerline takes advantage of the fact that vehicle lanes are constrained by definition to be parallel to each other and to the segment centerline. FIG. 3 illustrates a representative road segment and its parallel lanes. Instead of attempting to model each lane independently, the virtual centerline of the road segment is determined via the roadway model, and each lane thereof is described as a constant offset from the centerline. With an accurate representation of the road segment centerline, the offset (i.e., the perpendicular distance between the vehicle lane and the centerline) should be constant. Hence, a vehicle lane is represented with a single value, substantially reducing the lane models spaced dimensionality.

Previously, finding a sufficiently accurate road segment centerline has not been possible. Shape information on the road segments contained in commercially available digital maps is represented as a widely spaced sequence of latitude and longitudinal points, with an advertised accuracy of 15 meters. The points are connected by line segments to form the centerline geometry of the road segments. Efforts to determine vehicle lanes using a road centerline generated via this piecewise linear curve connection of points, and then computing positional trace offsets which are clustered together to identify the vehicle lanes, produced unsatisfactory results due to the inaccuracy of the digital map. Experimental evidence has shown that vehicle lanes are in actuality far from parallel to the linear curve obtained by connecting the shape information points. For example, an analysis of a sample trace in which no lane-changing occurs shows offsets from −20 to 10 meters from the digital map generated centerline, which offsets are well outside any known lane configurations.

Figure 4:
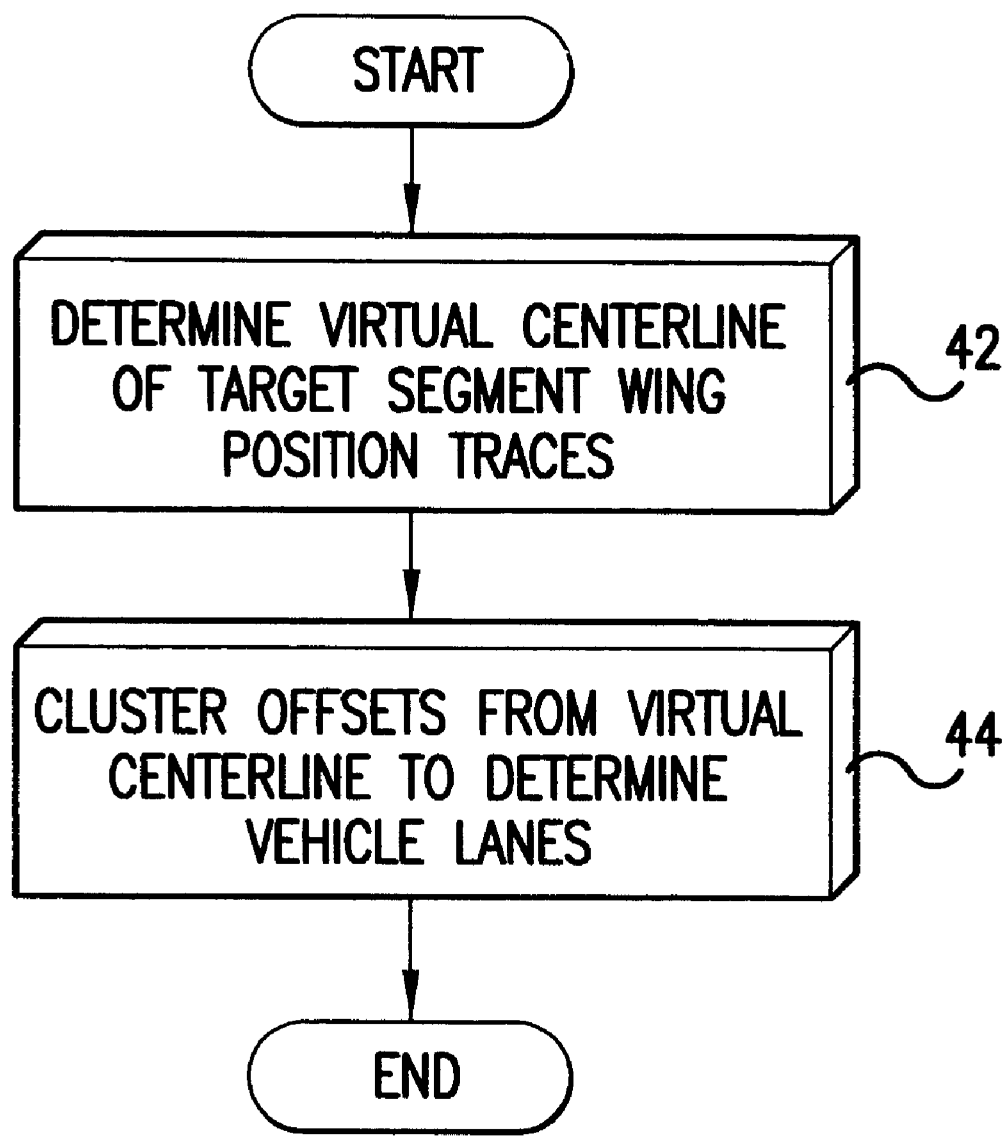
FIG. 4 is a flowchart of the general process according to one embodiment of the present invention.

Even though centerlines from commercially available digital maps are not accurate enough to compute constant lane offsets in order to determine the actual vehicle lanes, the present invention recognizes that any line parallel to the true vehicle lanes is, by definition, a constant distance from the actual vehicle lanes (in view of the vehicle lanes being constrained parallel to one another). The method and system thus brings the centerline generated from the original digital map into alignment with the position traces from the probe vehicles. An average between a current centerline and a new position trace, weighted by a confidence factor in the accuracy of the centerline and the position trace, is then computed. As the system incrementally incorporates more traces, it averages out errors in the traces to find a virtual centerline more accurate than any of the traces that went into developing it. With this centerline refinement procedure, finding a lane model for a target segment S, covered by a set of position traces P, is shown in FIG. 4 to involve first finding the accurate virtual centerline S using P (step 42), and then clustering P's offsets from the virtual centerline into vehicle lanes (step 44). Each of these acts will be described in greater detail below.

I. DETERMINING AN ACCURATE VIRTUAL ROAD CENTERLINE

Existing digital maps represent the centerline geometry of a road segment as a widely-spaced sequence of latitude/longitude points (having an accuracy of about 15 m) connected by line segments. This serves as the initial baseline information. This known baseline information is linearly interpreted to represent the centerline geometry at a high density (on the order of 10 m) to allow finer control. The use of linear interpolation is sufficient for low-curvature highways. For roads with higher curvatures, higher-order interpolations can be used to improve the accuracy or to reduce storage requirements of the system.

Figure 5:
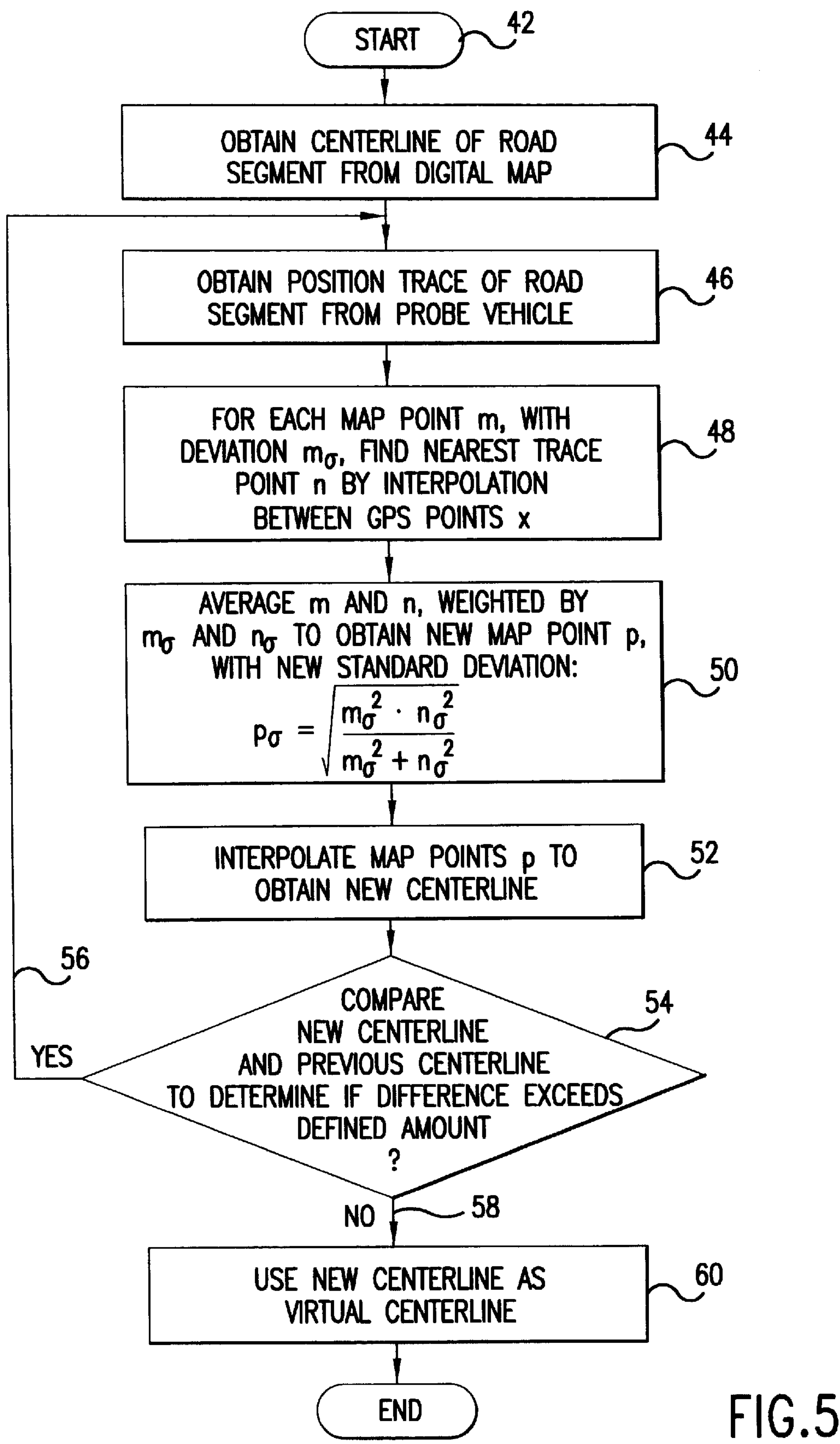
FIG. 5 is a flowchart of the process to determine a virtual centerline according to the present invention.

The centerline geometry refinement procedure iteratively improves upon the road geometry of a segment by performing a weighted average on the digital map with each position trace. FIG. 5 is a flow chart of this procedure 42 (see FIG. 4). At step 44, the process obtains the current centerline of a road segment from the digital map. Next, a position trace from a probe vehicle is obtained which corresponds to that road segment (step 46). From the current description of the road segment centerline and the position trace corresponding to that road segment, a new road segment centerline is produced (steps 48–62).

The process steps to obtain the new centerline are described with reference to the illustration of FIG. 6. There, a highway 64 is physically represented to have a number of lanes (LANES 1–3). The original digital map centerline is represented by points m spaced ten (10) meters apart. These points m are obtained by interpolation from the baseline information. A position trace 66 of a probe vehicle 10 is defined by its GPS points, indicated by an "x". For each map point m with a standard deviation $m_\sigma$, the process first finds a nearest point n on the position trace 66 by linearly interpolating between the GPS trace points x (step 48 of FIG. 5). The standard deviation $n_{94}$ a is the weighted average of the standard deviations of the surrounding GPS points x. A new map point p is determined (step 50) by the average of m and n weighted by $m_\sigma$and $n_\sigma$, having a new standard deviation given by the equation:

$$p_\sigma = \sqrt{\frac{m_\sigma^2 \cdot n_\sigma^2}{m_\sigma^2 + n_\sigma^2}}$$

Figure 6:
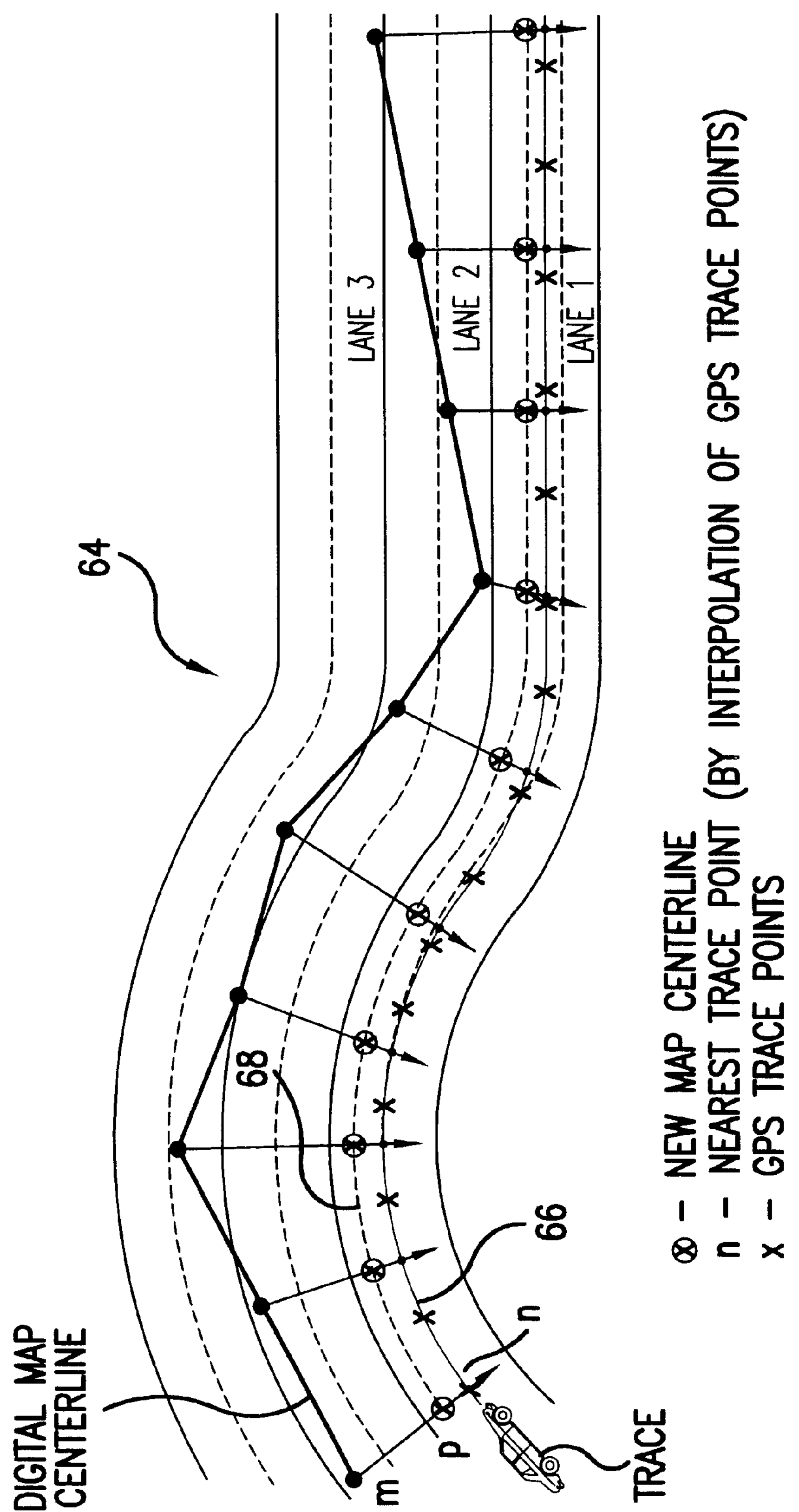
FIG. 6 is a representation illustrating the process for determining the virtual centerline according to FIG. 5.

As shown in FIG. 6, a new centerline 68 is thus formed by interpolating between the new map points p (step 52 of FIG. 5). Because this new centerline does not, in practice, represent the real centerline of the highway 64, it is termed a "virtual" centerline.

The net effect of these calculations for each point in the digital map is a weighted "averaging" of the baseline data from the map with the position traces. If the mean of the error distribution for the probe vehicle position is zero, as assumed, then the weighted average will become more accurate as the number of traces increases. As noted above, this procedure does not compute the actual centerline of the road pavement, but instead weights the centerline toward the most travelled lane, thus producing the virtual centerline. For example, if most vehicles travel along a road segment in LANE 1 and only some in LANE 2, then the virtual centerline will be closer to LANE 1. Since the virtual centerline is still parallel to the actual vehicle lanes, it does not matter that it is not the actual road centerline.

Once the new centerline is obtained, an inquiry is made (step 54) as to whether the new centerline produced with the position trace differs by a defined threshold amount from the previous centerline. If yes (arrow 56), then the process repeats itself for additional position traces using the new map points p as the baseline data map points m. If not (arrow 58), then the last calculated centerline is determined to be the virtual centerline having a sufficient degree of accuracy (step 60) to use in next determining the vehicle lanes.

II. CLUSTERING OFFSETS FROM VIRTUAL CENTERLINE INTO VEHICLE LANES

To determine the lane model of a particular road segment, the system uses the accurate geometrical representation of the virtual centerline of the road as determined above. An assumption is made that all lane centerlines are parallel to the virtual centerline. If the parallel assumption is not correct, this will be clear from subsequent analysis, in which case the road segment can be subdivided until the assumption is valid. Alternatively, the model can be changed. Since the vehicle lanes are parallel, the only parameter for each lane is the perpendicular distance of the driver to the virtual centerline, termed the "offset".

Figure 7:
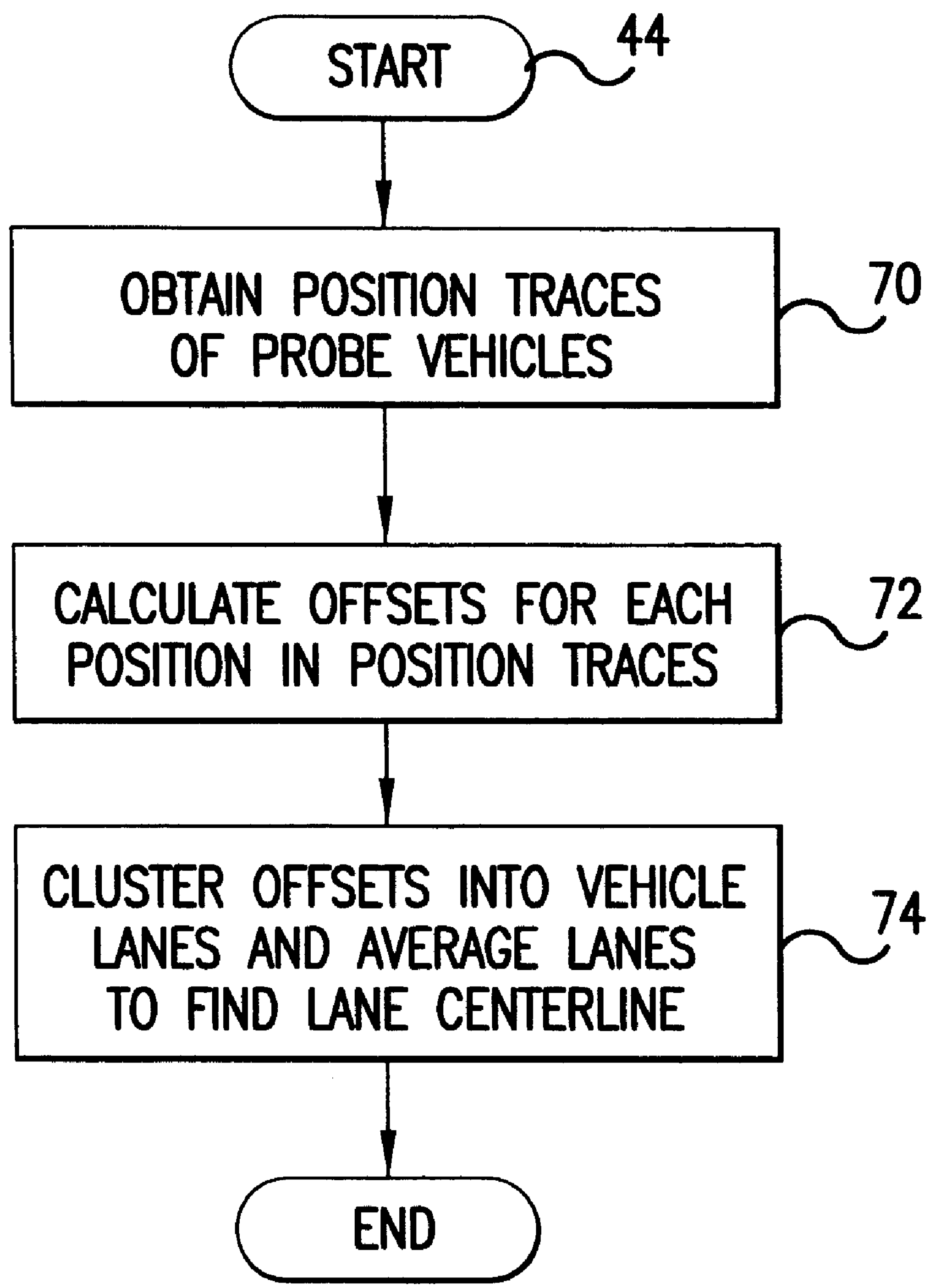
FIG. 7 is a flowchart of the process for modeling the vehicle lanes according to the present invention.
Figure 11:
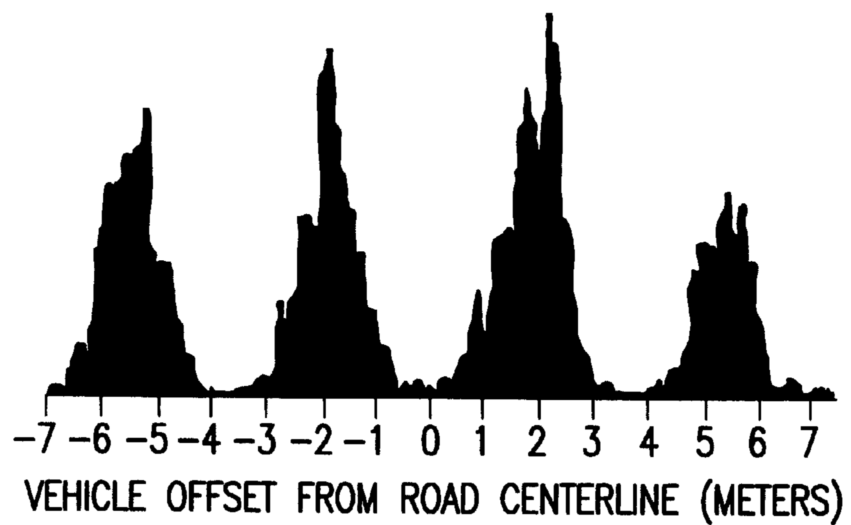
FIG. 11 is an illustration of the distribution of GPS based vehicle positions across a roadway.

This perpendicular distance provides an estimate of the offset for the lane. It is assumed drivers generally are in a lane. In practice, however, drivers are not always in the center of the lane. Also, GPS is sensitive to noise. Thus, the mean of many samples gives a more accurate estimate of the true offset. The FIG. 7 flowchart illustrates the process of determining the actual road lanes based on the determined virtual centerline. Beginning at step 44, a position trace of the probe vehicle 10 is obtained (step 70). The system then calculates an offset for each position in the position trace (step 72). These offsets are then grouped into vehicle lanes and averaged to find the lane centerline (step 74). FIG. 11 illustrates the distribution of GPS based vehicle positions across a roadway based on the vehicle offsets from the road centerline for a four lane freeway. Because the offsets are calculated based on an accurate virtual centerline, the clustering to find the vehicle lanes can be performed using the hierarchical agglomerative clustering-type algorithm. These types of algorithms are well known as described, for example, in "Clustering Algorithms, Wiley Series in Probability and Mathematical Studies", Wiley, N.Y., 1975 by John A. Hardigan.

In one embodiment, a map-matching module, which takes the position traces and the digital map, finds the most likely sequence of segments taken by the vehicle, along with the points in the position trace where the vehicle transitioned from one segment to another. The module uses a modified shortest path algorithm to find a minimum-error path from the nearest starting intersection to the nearest ending intersection. The error at each intersection in the path is the closest distance between the intersection and the position trace.

The map-matching module allows the system to focus on a single segment at a time. In order to model the lane structure for that particular segment, the clustering technique is used to separate vehicle positions into lanes, assuming that vehicles in the center of different lanes will always be a defined distance apart. Spatially clustering the positions is done using the hierarchical agglomerative clustering-type algorithm. This type of algorithm can take advantage of certain probabilities, for example, (1) if two points are less than half a lane apart, they are probably in the same lane, and (2) if a point is within half a lane of any point in a lane cluster, it is probably in that lane. Based on this prediction, it is possible to build lanes by initializing each point to be its own lane, and then merging lanes where a point from one lane is within a half lane of a point from the other. Advantageously, the algorithm further takes advantage of the knowledge that the vehicle lanes are constrained to be parallel to one another.

Two important properties of the agglomerative clustering method are that: (1) it will never merge two lanes into one, because the procedure will terminate if the closest clusters are farther apart than the minimum lane width; and (2) it makes no prior assumptions on the number of lanes in the roadway.

The system advantageously incrementally builds the lane models from the same virtual centerline. This dramatically improves the speed of the algorithm for each iteration (which otherwise is relatively slow) by using the results of the previous traces. If the previous iteration processed m offsets and found N lanes, with N<<m, and the current iteration is processing n offsets, the incremental algorithm creates one lane for the N known lanes and the n new points. This essentially integrates new offsets into the lane structure. To avoid spurious lanes from developing (e.g., from very noisy position data), each cluster must represent a certain percentage of the overall data, such as a one-percent threshold amount.

III. TEST EXAMPLE

To test the algorithms and empirically investigate their behavior, forty-four (44) position traces were collected along a 15 kilometer section of Interstate Highway 280 between Redwood City and Palo Alto, Calif. The positions were calculated twice a second from a differential GPS system using a Novatel DGPS receiver and a CSI differential corrections unit obtaining corrections from the U.S. Coast Guard beacon network. The data were then matched to the commercially available digital map to determine what segments each position trace traversed. Since the traces did not follow the same path, different segments received different numbers of passes. Each of the 42 total segments of Interstate 280 in the target region received between 9 and 35 passes. The difference in coverage is not considered to have a significant impact, so the results are averaged over all segments. All segments had four lanes, but all four lanes were not covered by any trace for a few segments. The traces generally stayed in one lane for the entire duration, and each point was tagged with the current lane, an integer from one to four.

A. Evaluating The Test Results

The test results were evaluated by looking at each process independently, as well as their combined performance.

1. Virtual Centerline Refinement Alone

Since lane prediction involves two concurrent processes, each process was first tested in isolation. Virtual centerline refinement is the most difficult algorithm to evaluate. The only objective evaluation is a comparison with the true (real) centerline, but there are no means of measuring this centerline. Traditional surveying is impractical for busy public highways. Geo-referenced aerial or satellite photographs are alternative sources of raw data, but the data may be noisy, and the vision processing algorithms may not be reliable. Construction blueprints are available, but there is no guarantee that the road is actually built according to plan. Additionally, all of these alternatives measure the center of the pavement, whereas the inventive process produces a virtual centerline "weighted" toward the most common lane sampled. So even if the independent centerline measurement is very different from the virtual centerline, it may not matter in regards to performing the overall task.

Besides the final accuracy of the virtual centerline, the rate of convergence provides useful information. Since the system is incremental, it can measure the difference between the current centerline at each iteration and a reference centerline. A plot of the average difference between the current and reference centerlines for each iteration, provides a learning curve describing how quickly the centerline approaches the reference. This information is used to estimate the number of passes necessary over a given segment before the virtual centerline stops changing significantly. Ideally, the reference centerline would be the true road centerline, but since the true centerline is unavailable, an approximation is necessary. The best approximation available is the final virtual centerline determined after the system has processed all position traces. The rate of convergence in this case describes how quickly the centerline approaches the final result.

Figure 8:
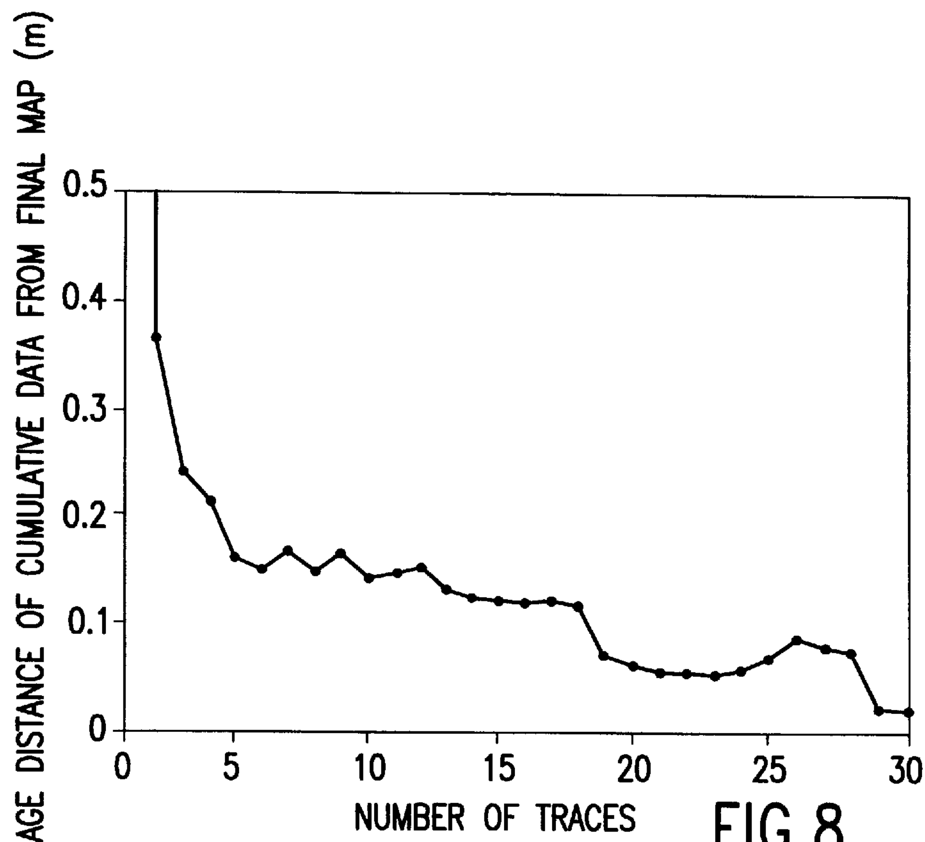
FIG. 8 is a plot illustrating the convergence of the centerline determination by plotting the difference between the centerline before each trace and the final virtual centerline.

FIG. 8 plots the difference between the centerline before each trace and the final virtual centerline for a representative highway segment. The original map database was provided by Navigation Technologies, Inc., and had an average error of about 7 meters. The plot shows that the major adjustment occurs on the first pass, where the baseline estimate is corrected by a GPS estimate with 1 to 2 meter accuracy. Processing the successive traces slowly improves accuracy by averaging out the noise in the GPS readings. Although there is no ground truth by which to measure the final accuracy, later processing critically relies on an accurate centerline, so good results in the later processing evaluations imply a sufficiently accurate virtual centerline.

2. Offset Clustering Alone

While it is difficult to measure a vehicle's true position within a lane, a rough evaluation of the lane models is possible. Although regular training data from the field is unlabeled, the data obtained here was labeled for testing purposes only. The label indicates the lane that the vehicle occupied for the given position. The system finds which cluster is closest to the position, and tests if the cluster matches the label. For example, if a position's perpendicular distance to the virtual centerline is 2.1 meters, and the closest cluster is centered at 2.0 meters, the system predicts that the vehicle is in the lane corresponding to that cluster. Although overall accuracy is important, the learning curve is also important here, because it is important to know the minimum number of passes over a segment that yields acceptable results. For this experiment, instead of a fixed test set evaluated against increasing amounts of training data, each position trace was incrementally treated first as testing data against the current lane models, then as training data to refine the lane models.

In order to match clusters with labels, integer labels (starting at one for the rightmost lane) were used in the tests. In the defined coordinate system, offsets increase as they move left, so smaller offsets correspond to lower lane numbers. Therefore, the evaluation matched the cluster with the smallest offset to the smallest lane label seen so far in training. It matched the cluster with the second-smallest offset to the second-smallest lane label seen so far, and so on. For example, if all the training data come from lanes two and four, the system maps the smallest cluster to lane two and the second-smallest to lane four. If an offset is closest to any other cluster, it is automatically wrong. This means that if there is a spurious cluster with a very small offset, all other clusters will be "bumped" to the next lane label, most likely making them all incorrect. This is not likely to happen, however, because the clustering algorithm deletes all clusters representing less than a threshold amount of one percent of the data.

Evaluation of the lane clustering process was based on the best virtual centerline model obtained, i.e., the result of centerline refinement on all 44 test traces. With this virtual centerline for all highway segments, the cumulative lane prediction accuracy was tested. For each trace, the system calculated the offsets from the virtual centerline, then integrated the offsets into the current lane clusters using the incremental clustering algorithm. For example, if all of the offsets in the current trace were between 5.0 meters and 5.5 meters, the system predicted that the vehicle was in this lane for all positions in the trace. The system then updated the lane by agglomerating the offsets into the lane cluster.

Figure 9:
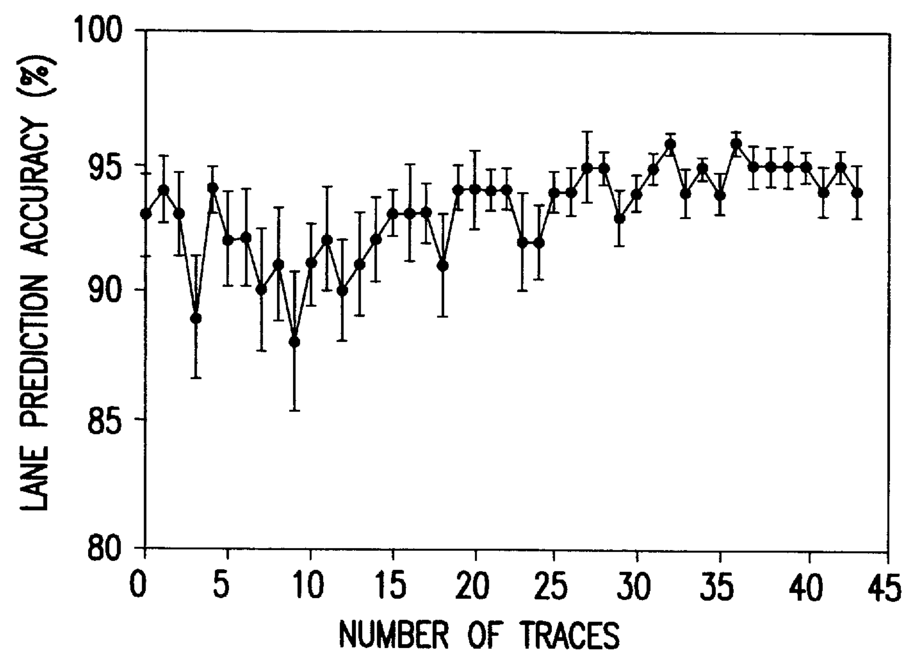
FIG. 9 is a plot of the average accuracy of the clustering algorithm over a number of position traces.

The accuracy of the trace is the percentage of positions in the trace whose nearest cluster matches its lane label. As the lanes get more data, the lane centers become more accurate and lane prediction accuracy improves. FIG. 9 plots the average accuracy of the clustering algorithm over 50 random orderings of the traces. Surprisingly, the results are initially quite good, then drop slightly for a few traces. By the 44$^{th}$ trace, the performance is at or slightly higher than the initial level. The initial good performance is due to the procedure for matching clusters to lanes. Since there are often samples of only one lane early in the experiment, the clustering algorithm will probably create only one cluster, and the mapping guarantees that this only cluster maps to the only tag, thus giving 100% accuracy. As more data become available, there are more clusters and a greater possibility of error. Overall accuracy probably never reaches 100% because of noisy GPS data and mislabeled points. These results indicate that, given an accurate virtual centerline for a segment traversed by several traces, the system confidently predicts a vehicle's lane.

3. Combined Performance

Figure 10:
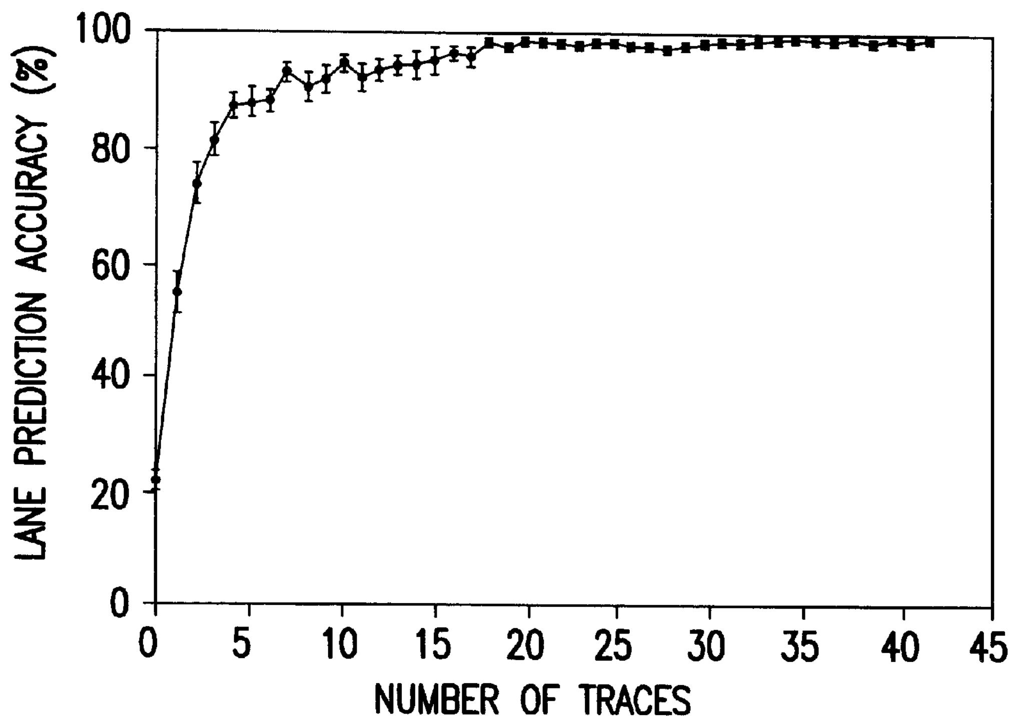
FIG. 10 is a plot of the average accuracy of the overall process according to the present invention based on the number of position traces available.

A combined evaluation of the centerline refinement and the lane clustering processes simulates the actual deployment of the system, because the system initially generates lane models with no information beyond the baseline digital map. The procedure is similar to lane clustering alone, except the system computed the offsets of the first trace from the Navigation Technologies baseline digital map. After computing the offsets and evaluating the predictions for each trace, the system refined the digital map centerline with the trace. FIG. 10 plots the average accuracy of the interleaved processes over 50 random orderings of the traces. As expected, the early results were poor, although somewhat above chance because of the inaccurate centerlines. Starting at the fifth position trace, the combined algorithm performed comparably to clustering on the most accurate centerline.

The test results show that starting with baseline geometry that is commercially available, an accurate road centerline and lane models can be generated after only a few high-precision GPS passes of probe vehicles. Because the position recorder is compact and robust enough to operate unattended in any probe vehicle, and because the algorithms make no assumption regarding particular route or lane changing characteristics, an entire road network can be modeled by distributing a number of recording units to vehicles. The vehicles, acting as probes during their normal driving patterns, accumulate information about the road network. Once a probe vehicle has sufficiently sampled its driving patterns, it can relay its data to a centralized computer to perform mapping services. The speed at which coverage and accuracy of the digital map improves is proportional to the number of probes in operation. The present invention thus provides a low-cost method and system not only for automatically augmenting and refining geographic databases, such as digital maps, but also for automatically mapping road networks with high geometric accuracy.

B. General Use Of The Invention

Through the use of uncoordinated probe systems, such as probe vehicles, gathering relatively imprecise spatial information, the invention makes it possible to determine much more precise spatial information, such as position information, by averaging the gathered imprecise spatial information. The invention can also infer directly or indirectly precise locations of other events, such as other sensor false alarms, traffic controls (stop signs), etc. This precise spatial information can be used to build or augment maps.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for autonomously developing substantially static geospatial information concerning a particular area using a plurality of uncoordinated probe systems moving in said area, the method comprising the acts of:

obtaining probe system specific geospatial information of a lower quality from only the plurality of probe systems moving in said area;

combining said probe system specific information obtained over time into a data set;

analyzing said data set to determine substantially static geospatial information of a higher quality;

wherein said probe system specific geospatial information is position information;

wherein the probe systems are probe vehicles, and further comprising the act of developing map information on the particular area based on the higher quality geospatial information;

wherein the act of developing the map information comprises the act of deriving at least one of roadway and vehicle lane geometry information; and wherein the act of deriving at least one of roadway and vehicle lane geometry information comprises the acts of:

obtaining a baseline trace of the position information of an initial probe vehicle to determine an initial virtual roadway centerline; and refining the initial virtual roadway centerline based on additional traces of position information from subsequent probe vehicles traveling the roadway to derive the location of the roadway.

2. The method according to claim 1, wherein the map information is a road map, and further comprising the act of deriving traffic control information for the road map based on the higher quality geospatial information.

3. The method according to claim 1, further comprising the act of evaluating said data set to infer environmental driving information for the particular area.

4. The method according to claim 1, wherein the act of refining comprises the acts of iteratively performing a weighted averaging of a precedingly determined virtual roadway centerline with each additional position trace to determine a refined virtual roadway centerline.

5. The method according to claim 4, further comprising the acts of:

calculating offsets from the virtual roadway centerline for each position in a position trace for a plurality of said position traces; and clustering the offsets to determine the vehicle lane geometry information for the roadway.

6. The method according to claim 5, wherein the act of clustering is performed using a hierarchical agglomerative clustering-type algorithm.

7. The method according to claim 1, wherein the probe systems are probe vehicles, and further comprising the act of deriving traffic control information based on the higher quality geospatial information.

8. The method according to claim 1, wherein said probe specific geospatial information comprises both a position of the probe system and time information on the position.

9. The method according to claim 1, wherein the act of obtaining probe specific geospatial information comprises the act of equipping each probe system with a global positioning system receiver.

10. The method according to claim 9, wherein said probe specific geospatial information comprises signal interruption information from the global positioning system receiver, and further comprising the act of developing map information of obstructions above the probe systems in the particular area based on the higher quality geospatial information of the signal interruption information.

11. The method according to claim 1, wherein said analyzing act averages the data set to determine the higher quality geospatial information.

12. A system for developing substantially static geospatial information concerning a particular area, comprising:

a plurality of probe vehicles operable to move in the area in an uncoordinated manner, each probe vehicle including at least a position sensor to detect its position with a defined accuracy as it moves in the area, and a communications device to communicate the detected positions;

a central processor which receives the detected positions from the plurality of probe vehicles, the central processor comprising means for combining only the detected positions into a data set and means for analyzing the data set to derive the substantially static geospatial information having a higher level of accuracy than that detected by the individual probe vehicles;

wherein the geospatial information at a higher level of accuracy is roadway lane information, said means for analyzing the data set to determine the roadway lane information comprising:

means for determining a virtual centerline of the roadway based on position traces formed by the detected positions from each probe vehicle;

means for calculating offsets from the virtual centerline for each position in a position trace for each of the position traces; and means for clustering the offsets to determine the vehicle lane information for the roadway.

13. The system according to claim 12, wherein the means for analyzing averages the detected positions.

14. The system according to claim 12, wherein the geospatial information includes at least one of road geometry and traffic control information.

15. The system according to claim 12, wherein the means for obtaining a virtual centerline comprises:

means for obtaining an initial roadway centerline from an initial position trace from a probe vehicle; and means for refining the initial roadway centerline based on additional position traces from the plurality of probe vehicles.

16. The system according to claim 15, wherein the means for refining the initial roadway centerline comprises means for iteratively performing a weighted averaging of a precedingly determined roadway centerline with each additional position trace to determine the virtual roadway centerline.

17. A method for autonomously developing vehicle lane information for a roadway map using a plurality of probe vehicles supplying position traces when traveling, the method comprising the acts of:

obtaining a baseline roadway centerline from an initial position trace from one of the probe vehicles;

refining the baseline roadway centerline to obtain a virtual centerline by iteratively performing a weighted averaging of the baseline roadway centerline with a number of position traces from the plurality of probe vehicles;

calculating an offset from the virtual centerline for each position in the position traces supplied by the plurality of probe vehicles; and clustering the offsets into vehicle lanes and averaging the clustered offsets to determine each lane centerline.

* * * * *